US011682784B2

(12) United States Patent
Kim et al.

(10) Patent No.: US 11,682,784 B2
(45) Date of Patent: Jun. 20, 2023

(54) METHOD OF PREPARING HIGH-PURITY ELECTROLYTE SOLUTION FOR VANADIUM REDOX FLOW BATTERY USING CATALYTIC REACTION

(71) Applicant: LOTTE CHEMICAL CORPORATION, Seoul (KR)

(72) Inventors: Hee-Tak Kim, Daejeon (KR); Jiyun Heo, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 176 days.

(21) Appl. No.: 16/975,850

(22) PCT Filed: Feb. 25, 2019

(86) PCT No.: PCT/KR2019/002255
§ 371 (c)(1),
(2) Date: Aug. 26, 2020

(87) PCT Pub. No.: WO2019/164356
PCT Pub. Date: Aug. 29, 2016

(65) Prior Publication Data
US 2020/0411894 A1 Dec. 31, 2020

(30) Foreign Application Priority Data
Feb. 26, 2018 (KR) .................. 10-2018-0023014

(51) Int. Cl.
*H01M 8/18* (2006.01)
*H01M 8/1016* (2016.01)

(52) U.S. Cl.
CPC ......... *H01M 8/188* (2013.01); *H01M 8/1016* (2013.01); *H01M 2300/0008* (2013.01); *H01M 2300/0011* (2013.01)

(58) Field of Classification Search
CPC .............. H01M 8/188; H01M 8/1016; H01M 2300/0008; H01M 2300/0011
See application file for complete search history.

(56) References Cited

U.S. PATENT DOCUMENTS

| | | | |
|---|---|---|---|
| 5,368,762 A | 11/1994 | Sato et al. | |
| 2015/0050570 A1* | 2/2015 | Keshavarz | H01M 8/20 429/409 |

(Continued)

FOREIGN PATENT DOCUMENTS

| | | |
|---|---|---|
| JP | H05290871 A | 11/1993 |
| JP | 2001052731 A | 2/2001 |

(Continued)

*Primary Examiner* — Stewart A Fraser
(74) *Attorney, Agent, or Firm* — Osha Bergman Watanabe & Burton LLP

(57) ABSTRACT

The present invention relates to a method of preparing a high-purity electrolyte solution for a vanadium redox flow battery using a catalytic reaction, and more specifically, to a method of preparing a high-purity electrolyte solution having a vanadium oxidation state of +3 to +5 from a mixture solution containing a vanadium precursor, a reducing agent, and an acidic solution, by using a catalyst. By using a catalyst and a reducing agent that does not leave impurities such as $Zn^{2+}$, which are generated when preparing electrolyte solutions using an existing metal reducing agent, the high-purity electrolyte solution for a vanadium redox flow battery (VRFB) according to the present invention eliminates the need for an additional electrolysis process; does not form toxic substances during a reaction process, and thus is environmentally friendly; and is electrochemically desirable under milder process conditions than that of an existing process. In addition, the VRFB comprising the electrolyte solution prepared according to the present invention may be used to expand the utility of new renewable energy through price reduction of large-capacity energy storage devices.

12 Claims, 4 Drawing Sheets

(56) References Cited

U.S. PATENT DOCUMENTS

| | | | | |
|---|---|---|---|---|
| 2015/0303504 A1* | 10/2015 | Li | ............... | H01M 8/04798 |
| | | | | 429/409 |
| 2018/0105944 A1* | 4/2018 | Smeltz | ............ | H01M 8/188 |
| 2019/0131650 A1* | 5/2019 | Stahl | ............ | H01M 4/9083 |

FOREIGN PATENT DOCUMENTS

| | | |
|---|---|---|
| JP | 2004071165 A | 3/2004 |
| JP | 2014532284 A | 12/2014 |
| KR | 101367618 B1 | 2/2014 |
| KR | 101415538 B1 | 6/2014 |
| KR | 20140083027 A | 7/2014 |
| KR | 1020160074430 A | 6/2016 |
| KR | 101653765 B1 | 8/2016 |
| KR | 101776657 B1 | 9/2017 |
| KR | 101784059 B1 | 9/2017 |

\* cited by examiner

METHOD OF PREPARING HIGH-PURITY ELECTROLYTE SOLUTION FOR VANADIUM REDOX FLOW BATTERY USING CATALYTIC REACTION

CROSS-REFERENCE TO RELATED APPLICATIONS

This is a U.S. national phase under the provisions of 35 U.S.C. § 371 of International Patent Application No. PCT/KR19/02255 filed Feb. 25, 2019, which in turn claims priority under 35 U.S.C. § 119 of Korean Patent Application No. 10-2018-0023014 filed Feb. 26, 2018. The disclosures of such of International Patent Application No. PCT/KR19/02255 and Korean Patent Application No. 10-2018-0023014 are hereby incorporated herein by reference in their respective entireties, for all purposes.

TECHNICAL FIELD

The present invention relates to a method of preparing a high-purity electrolyte solution for vanadium redox flow batteries using a catalytic reaction, and more specifically to a method of preparing a high-purity electrolyte solution having a vanadium valence of +3 to +5 using a catalyst from a mixture solution containing a vanadium precursor, a reducing agent, and an acidic solution.

BACKGROUND ART

In response to the global depletion of petroleum energy, interest in renewable energy is increasing rapidly. In addition to new and renewable energy, ESS (energy storage system) is also attracting a great deal of attention, and the global market for ESS associated with new and renewable energy is expected to grow to more than 1 trillion dollars in 2024 (CAGR 22.1%, Fuji Economy 2015). A similar trend is shown in Korea, and the market is expected to grow to 120 billion dollars in 2024. The development of vanadium redox flow batteries (VRFBs), which are the closest to being industrially applied to ESS markets along with lithium-ion batteries, is accelerating worldwide, and thus the performance and price of vanadium redox flow batteries (VRFBs) need to be improved.

For vanadium redox flow batteries, electrolyte solutions account for the highest proportion of costs among battery component parts (1 MW/8 MWh system electrolyte price proportion: 52%). Therefore, lowering the price of electrolyte solutions is essential for securing price competitiveness of vanadium redox flow batteries.

The most widely used vanadium raw materials for preparing electrolytes for vanadium redox flow batteries are $V_2O_5$ and $VOSO_4$, and those compounds are dissolved in an acid solution to obtain pentavalent and tetravalent electrolyte solutions, respectively. Since $V_2O_5$ is relatively cheap, a method of preparing a pentavalent electrolyte solution by dissolving $V_2O_5$ in an acid solution is mainly used. Meanwhile, as the currently used vanadium redox flow battery system is operated by injecting a 3.5-valent ($VO^{2+}/V^{3+}=1/1$) electrolyte solution into the cathode and anode of the vanadium redox flow battery cell, there is a need for a method of preparing a cheaper high-purity 3.5-valent electrolyte solution from a 5-valent electrolyte solution.

In order to prepare a tetravalent electrolyte solution using a vanadium pentavalent electrolyte solution, a chemical oxidation-reduction reaction of pentavalent electrolyte solution with a reducing agent can be used. However, such a method using a chemical reducing agent has a problem in that it is impossible to prepare an electrolyte solution having a low valence of 4 or less.

A 3.5-valent vanadium redox flow battery electrolyte solution can be prepared using electrolysis and a metal reducing agent. In the case of preparing an electrolyte solution using electrolysis, a 4-valent electrolyte solution is injected into a vanadium redox flow battery so that the vanadium redox flow battery undergoes a charging process. When the vanadium redox flow battery is charged after injecting the 4-valent electrolyte solution into the positive and negative electrode thereof, the positive electrode electrolyte solution is converted to a 5-valent electrolyte solution and the negative electrode electrolyte solution is converted to a 3-valent electrolyte solution. By mixing the obtained 3-valent and 4-valent electrolyte solutions at equal equivalents, a 3.5-valent electrolyte solution can be prepared. The electrolysis method described above may cause problems of wasting an amount of electrolyte solution equivalent to ⅓ of the total thereof due to the generation of an excess 5-valent electrolyte solution during the process of obtaining the 3.5-valent electrolyte, and increasing the electrolyte solution preparation cost due to stack installation, power consumption, operation and maintenance costs. In addition, in the case of preparing an electrolyte solution using a metal reducing agent, the 4-valent electrolyte solution can be reduced to a 3-valent electrolyte solution by adding a metal having strong reducing power such as Zn thereto, but unnecessary impurities such as $Zn^{2+}$ remain in the prepared electrolyte solution after the reaction, which requires an additional process for removing the impurities and causes a problem of deteriorated efficiency of the vanadium redox flow battery due to the impurities that cannot be removed.

There are several prior arts. For example, Korean Patent No. 10-1415538 discloses a method of preparing positive and negative electrode electrolyte solutions for vanadium redox batteries from $VOSO_4$ through electrolysis, and Korean Patent No. 10-1784059 discloses a vanadium electrolyte solution for positive electrode having excellent low-temperature stability by preparing $V^{5+}$ ions through electrochemical reaction of a solution containing a small amount of $VOSO_4$ and then further dissolving $VOSO_4$. In addition, Korean Patent No. 10-1653765 discloses a method of preparing a vanadium electrolyte solution for positive electrode using a reducing agent such as oxalic acid or ethanol from a $V_2O_5$ precursor. However, none of the above inventions disclose the use of a catalyst or the addition of a substance that can accelerate the oxidation reaction of a reducing agent.

Korean Patent No. 10-1776657 discloses a method of preparing a vanadium electrolyte solution from a waste desulfurization catalyst, but this method aims to prepare a tetravalent vanadium electrolyte solution. Furthermore, a secondary reducing agent containing a zinc powder was used to prepare a trivalent vanadium electrolyte solution. In the case of preparing an electrolyte solution using such a metal reducing agent, unnecessary impurities remain in the prepared electrolyte solution after the reaction, which incurs additional process costs for removing the impurities and causes a problem of deteriorated efficiency of the vanadium redox flow battery due to impurities that cannot be removed.

Accordingly, as a result of extensive efforts by the present inventors to develop an electrolyte solution for a vanadium redox flow battery that does not generate an excess pentavalent electrolyte solution and does not leave impurities, the present inventors found that a high-purity electrolyte solution containing vanadium having a valence in the range of trivalence to pentavalence can be prepared by using a reducing agent that does not leave impurities and adding a catalyst capable of accelerating the oxidation reaction of the reducing agent so as to facilitate the reduction reaction of the vanadium ion. Based on this finding, the present invention has been completed.

SUMMARY OF THE INVENTION

It is an object of the present invention to provide a method of preparing a high-purity electrolyte solution for vanadium redox flow batteries that does not generate an excessive amount of a pentavalent electrolyte solution and does not leave impurities.

In accordance with one aspect of the present invention, the above and other objects can be accomplished by the provision of a method of preparing a high-purity electrolyte solution for vanadium redox flow batteries, comprising reacting a vanadium solution with a catalyst to prepare a solution containing vanadium of a valence ranging from trivalence to pentavalence, wherein the solution containing vanadium is prepared by mixing a vanadium precursor, a reducing agent and an acidic solution.

In accordance with another aspect of the present invention, provided is a method of preparing a high-purity electrolyte solution for vanadium redox flow batteries including mixing a vanadium precursor, a reducing agent and an acidic solution to prepare a vanadium solution having a valence ranging from pentavalence to tetravalence, and adding a reducing agent to the prepared vanadium solution and then reacting the resulting mixture with a catalyst to prepare a solution containing vanadium of a valence ranging from trivalence to tetravalence.

DESCRIPTION OF REFERENCE NUMERALS

Figure 1:
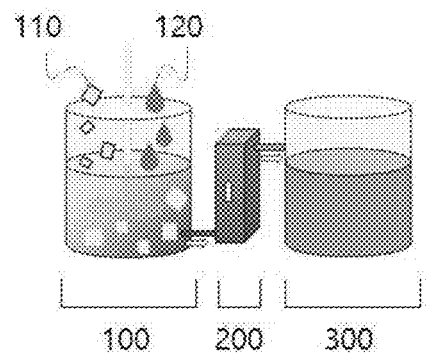
FIG. 1 is a schematic diagram illustrating a method of preparing a high-purity electrolyte solution for vanadium redox flow batteries using a catalytic reaction according to an embodiment of the present invention.
Figure 2:
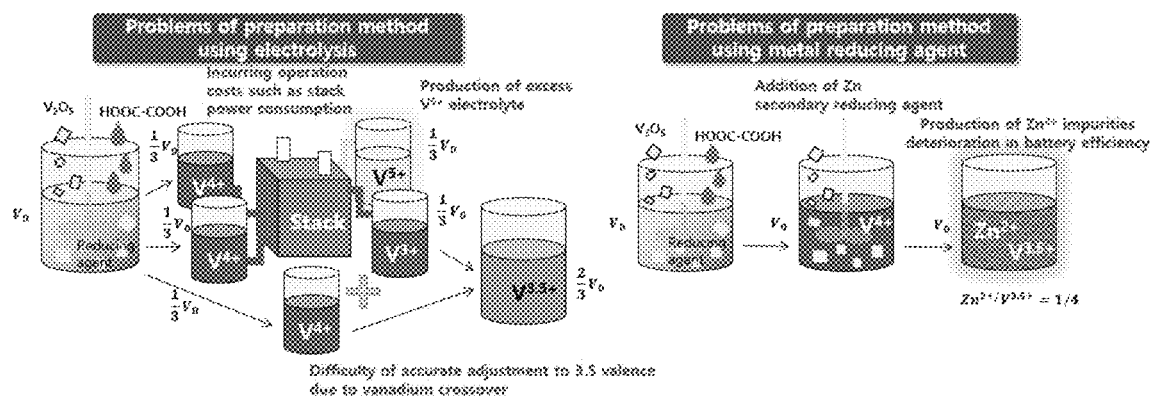
FIG. 2 is a schematic diagram illustrating a conventional method of preparing an electrolyte solution for vanadium redox flow batteries.

100: Raw material mixer
110: Vanadium precursor
120: Reducing agent
200: Catalytic reactor
300: Vanadium electrolyte solution

BEST MODE FOR CARRYING OUT THE INVENTION

Unless defined otherwise, all technical and scientific terms used herein have the same meanings as appreciated by those skilled in the field to which the present invention pertains. In general, the nomenclature used herein is well-known in the art and is ordinarily used.

In the present invention, as a result of research to solve the problem of wasting an amount equivalent to ⅓ of the total electrolyte solution due to the excess pentavalent electrolyte solution generated when the electrolyte solution is prepared using conventional electrolysis, the problem of increased electrolyte preparation cost due to stack installation, power consumption and operation and maintenance costs, and problems, which occur when preparing an electrolyte solution using a metal reducing agent, of additional process costs for removing impurities such as $Zn^{2+}$ and deteriorated efficiency of the vanadium redox flow battery due to unremoved impurities, it was found that a high-purity electrolyte solution containing vanadium having a valence ranging from trivalence to tetravalence can be prepared by using a reducing agent that does not leave impurities and adding a catalyst capable of accelerating the oxidation reaction of the reducing agent to facilitate the reduction reaction of the vanadium ion.

In one aspect, the present invention provides a method of preparing a high-purity electrolyte solution for vanadium redox flow batteries, comprising reacting a vanadium solution with a catalyst to prepare a solution containing vanadium of a valence ranging from trivalence to pentavalence, wherein the solution containing vanadium is prepared by mixing a vanadium precursor, a reducing agent and an acidic solution.

In another aspect, the present invention provides a method of preparing a high-purity electrolyte solution for vanadium redox flow batteries including mixing a vanadium precursor, a reducing agent and an acidic solution to prepare a vanadium solution having a valence ranging from pentavalence to tetravalence, and adding a reducing agent to the prepared vanadium solution and then reacting the resulting mixture with a catalyst to prepare a solution containing vanadium of a valence ranging from trivalence to tetravalence.

In the present invention, the vanadium precursor preferably includes at least one selected from the group consisting of $V_2O_5$, $VOSO_4$, $NH_4VO_3$ and $V_2O_4$, but is not limited thereto.

In addition, the present invention provides a method of preparing a high-purity electrolyte solution for vanadium redox flow batteries including mixing a vanadium precursor, a first reducing agent and an acidic solution to prepare a vanadium solution having a valence ranging from pentavalence to tetravalence, adding a second reducing agent to the prepared vanadium solution, and reacting the resulting mixture with a catalyst to prepare a vanadium solution having a valence ranging from trivalence to tetravalence. The first reducing agent and the second reducing agent may be the same as or different from each other.

In the present invention, the reducing agent preferably includes at least one selected from the group consisting of formic acid, formaldehyde, methanol, ethanol, oxalic acid, and ammonium hydroxide. However, any substance may be used without limitation thereto so long as it does not leave impurities other than a gaseous form.

In the present invention, the acidic solution preferably includes at least one selected from the group consisting of sulfuric acid, hydrochloric acid, nitric acid and phosphoric acid. Any strong acid may be used as the acidic solution, without limitation thereto.

In the present invention, the catalyst is preferably a noble metal catalyst, a non-noble metal catalyst, or an alloy catalyst containing the noble metal catalyst and the non-noble metal catalyst.

In the present invention, the noble metal catalyst preferably includes at least one selected from the group consisting of platinum (Pt), ruthenium (Ru), palladium (Pd), iridium (Ir), rhodium (Rh), silver (Ag), and gold (Au).

In the present invention, the non-noble metal catalyst preferably includes at least one selected from the group consisting of iron (Fe), nickel (Ni), copper (Cu), metal oxides, carbon (C) and heteroatom-doped carbon. In addition, the metal oxide is TiO2, MnO, or the like.

In the present invention, the catalyst may be used in a form supported on at least one support selected from the group consisting of carbon, metal oxides and polymers, and may be used in a form not supported on the support.

In addition, the catalyst that can be used in the present invention may be a commercially available catalyst or may be directly synthesized, and in addition to the above-mentioned catalyst, may be metal black, metal wire, metal plate, metal/$CeO_2$ or the like that is not supported on carbon.

According to an embodiment of the present invention, a PtRu/C or Pt/C catalyst enables a very good reaction rate, and the flow battery operated using an electrolyte solution prepared using the Pt/C catalyst causes no problems and exhibits battery efficiency at or above the conventional level. In addition, the PtAu/C catalyst is expected to exhibit a reaction rate equal to or higher than that of the PtRu/C or Pt/C catalyst, and the PtPd/C or Pd/C catalyst is expected to exhibit a very high reaction rate, and non-noble metal catalysts such as Cu, Ag, Fe and Ni are also expected to exhibit excellent reaction rates. In addition, taking into consideration the fact that the vanadium redox flow battery including the electrolyte solution prepared using the Pt/C catalyst exhibits battery efficiency at or above the conventional level, the vanadium redox flow battery containing an electrolyte solution prepared using the catalyst according to the present invention is also expected to exhibit excellent battery performance.

In the present invention, the concentration of the reducing agent is preferably 0.1M to 3.0M, more preferably 0.5M to 2M. At this time, when the concentration of the reducing agent is less than 0.1M, there is a problem in that the reducing agent cannot sufficiently reduce vanadium ions, and when the concentration of the reducing agent is more than 3.0M, there is a problem in that an excess reducing agent remains.

In the present invention, the concentration of the acidic solution is preferably 0.1M to 10.0M, more preferably 0.5M to 4M. At this time, when the concentration of the acidic solution is 0.1M or less, there are problems associated with battery efficiency and the stability of pentavalent vanadium ions, and when the concentration of the acidic solution is 10.0M or more, there is a problem associated with the solubility of vanadium ions due to the common ion effect.

In the present invention, the concentration of the vanadium precursor is preferably 0.1M to 3.0M, more preferably 0.5M to 2M. At this time, when the concentration of the vanadium precursor is 0.1M or less, there is a problem related to battery capacity, and when the concentration of the vanadium precursor is 3.0M or more, there is a problem related to the solubility of vanadium ions.

In the present invention, the reaction is preferably performed at a temperature of 0° C. to 120° C., more preferably at 40° C. to 95° C. At this time, when the reaction temperature is 0° C. or less, there is a problem in that water, which is a solvent, freezes, thus blocking the reaction, and when the reaction temperature is 120° C. or more, all of the solvent evaporates, causing a problem of changed concentration.

In the present invention, the term "vanadium solution having a valence ranging trivalence and tetravalence" means an electrolyte solution in the state that enables the flow battery to operate without a separate process, among the electrolyte solutions of the vanadium redox flow battery. More specifically, the trivalent to tetravalent vanadium solution means a range of the intermediate valence of the valences of the anode and the cathode in a fully charged state of an electrolyte solution commonly used in vanadium flow batteries. Furthermore, in addition to the trivalent vanadium solution or the tetravalent vanadium solution, a 3.1-, 3.2-, 3.3-, 3.4- or 3.5-valent vanadium solution or the like may be present depending on the mixing ratio of the trivalent and tetravalent vanadium solutions.

The present invention relates to a novel method of preparing an electrolyte solution capable of overcoming the drawbacks of the conventional method of preparing 3-valent and 3.5-valent electrolyte solutions, characterized in that electrolysis is not used and a metal reducing agent leaving impurities is not used. In addition, a reducing agent (formic acid, oxalic acid, methanol, etc.) that does not leave impurities is injected into a pentavalent to tetravalent electrolyte solution to prepare a trivalent to pentavalent electrolyte solution, and the key feature of the present invention is to facilitate the reduction reaction of vanadium ions by adding a catalyst capable of accelerating the oxidation reaction of the reducing agent.

Figure 3:
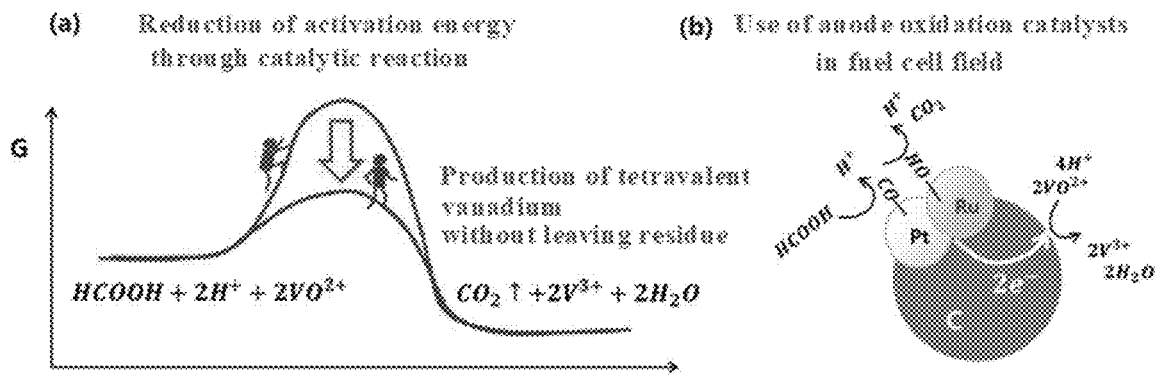
FIG. 3 shows the characteristics of the method for preparing a high-purity electrolyte solution for vanadium redox flow batteries using a catalytic reaction according to an embodiment of the present invention.

In addition, unlike the electrolysis method, the present invention does not require an electrochemical cell, does not consume power, and does not cause a change in vanadium ion concentration. In addition, unlike the metal reduction, the method according to the present invention does not leave any impurities (removal in the form of $CO_2$ gas), so a high-purity vanadium electrolyte solution can be economically prepared (see FIG. 3).

Figure 4:
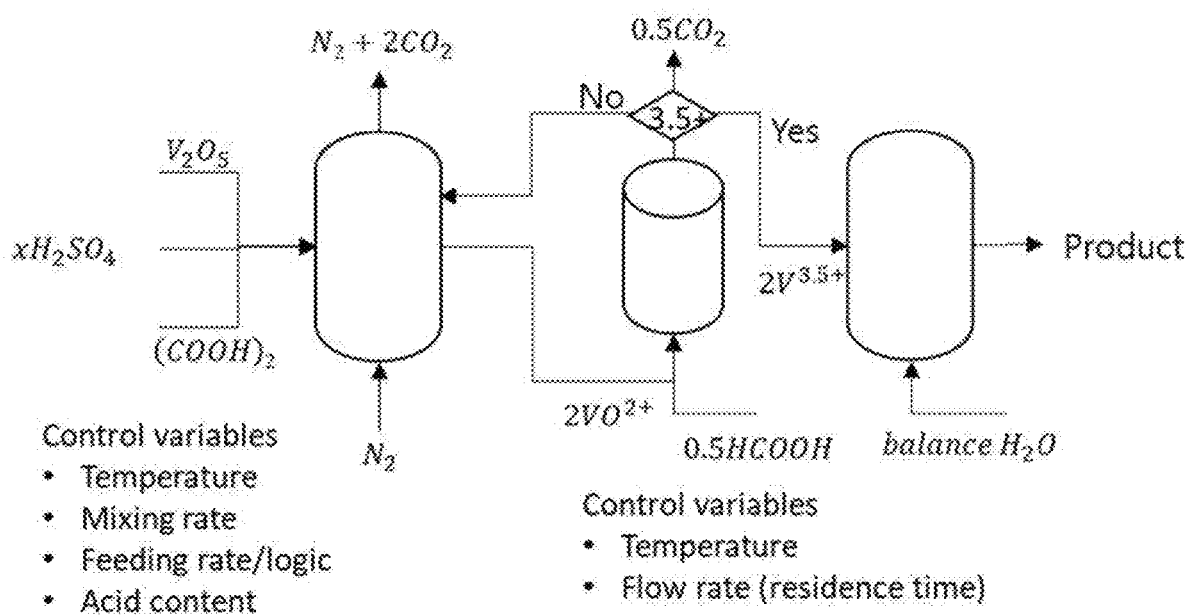
FIG. 4 is a schematic diagram illustrating a process of preparing a high-purity electrolyte solution for vanadium redox flow batteries using a catalytic reaction according to an embodiment of the present invention.

FIG. 4 is a schematic diagram illustrating a method of preparing a high-purity electrolyte solution for vanadium redox flow batteries using a catalytic reaction according to an embodiment of the present invention. V2O5 and a reducing agent are added to a sulfuric acid solution in a pre-mixer to prepare a vanadium electrolyte solution having a desired valence ranging from pentavalence to tetravalence, and the vanadium electrolyte solution is injected into a catalytic reactor for a reduction reaction in the catalytic reactor to thereby prepare a tetravalent to trivalent electrolyte solution. The reducing agent used herein may be oxalic acid, formic acid, methanol, ethanol, or a higher alcohol, and the catalyst used herein may be a noble metal catalyst including platinum, ruthenium, palladium or iridium, or a non-noble metal catalyst including iron, nickel, copper, carbon, and heteroatom-doped carbon. The catalyst may be used in a form supported on carbon, metal oxide, or polymer.

The following reaction scheme depicts a reduction reaction of pentavalent vanadium ions ($VO_2^+$) to tetravalent vanadium ions ($VO^{2+}$) or trivalent vanadium ions ($V^{3+}$) using the oxidation reaction of formic acid.

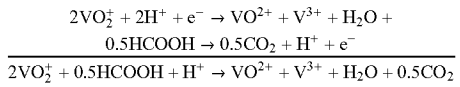

In addition, the following reaction scheme depicts the dissolution of a vanadium precursor ($V_2O_5$) into a pentavalent vanadium ion ($VO_2^+$) and the reduction reaction of the pentavalent vanadium ion to a tetravalent vanadium ion ($VO^{2+}$) using oxalic acid [$(COOH)_2$].

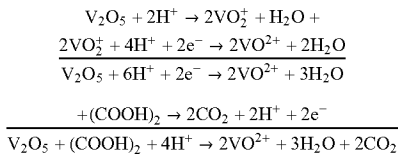

Compared to the conventional electrolyte solution preparation method, the present invention has advantages of lowering the price of the electrolyte solution and improving the performance of the electrolyte solution due to the high purity thereof because it is realized in a simple manner and does not leave impurities. In the case in which metal ions are present, as in the metal reduction method, electrochemical reactions of metal ions and side reactions (generation of hydrogen) by the electrodeposited metals are promoted, resulting in a problem of reduced efficiency of the battery, but the present method of preparing an electrolyte solution can fundamentally overcome these problems. In addition, crossover of vanadium ions through the membrane within the electrolytic cell during the electrolysis for the preparation of the electrolyte solution causes the difficulty in controlling the vanadium concentration, which may impinge the utilization of capacity of the battery. However, the present method of preparing an electrolyte solution can fundamentally prevent the problem associated with changed vanadium concentration that occurs during the preparation of the electrolyte solution.

Compared to the competitive electrolysis method, the electrolyte solution prepared according to the present invention does not generate an excess pentavalent electrolyte solution, has a high electrolyte solution preparation rate (2 times), has a low electrolyte solution preparation cost (the preparation cost is reduced by 30%, based on the preparation of 1,000 m³), and exhibits excellent life and efficiency, because it does not contain impurities of the metal ion reducing agent, unlike one prepared by the chemical preparation method using a metal reducing agent.

Hereinafter, the present invention will be described in more detail with reference to the following examples. However, it will be obvious to those skilled in the art that the following examples are provided only for illustration of the present invention and should not be construed as limiting the scope of the present invention based on the subject matter of the present invention.

Example 1

In this example, the effects were compared according to the type of reducing agent when preparing a high-purity electrolyte solution for vanadium redox flow batteries.

An electrolyte solution was prepared by adding a 0.75M reducing agent to a tetravalent vanadium electrolyte (1.5M in 4.5M sulfate), adding 0.1 g of a PtRu/C catalyst in 100 ml of a vanadium solution thereto, and allowing the reaction to proceed at 55° C. The reducing agent used to prepare the electrolyte solution was methanol (MeOH), oxalic acid (OA), or formic acid (FA).

Figure 5:
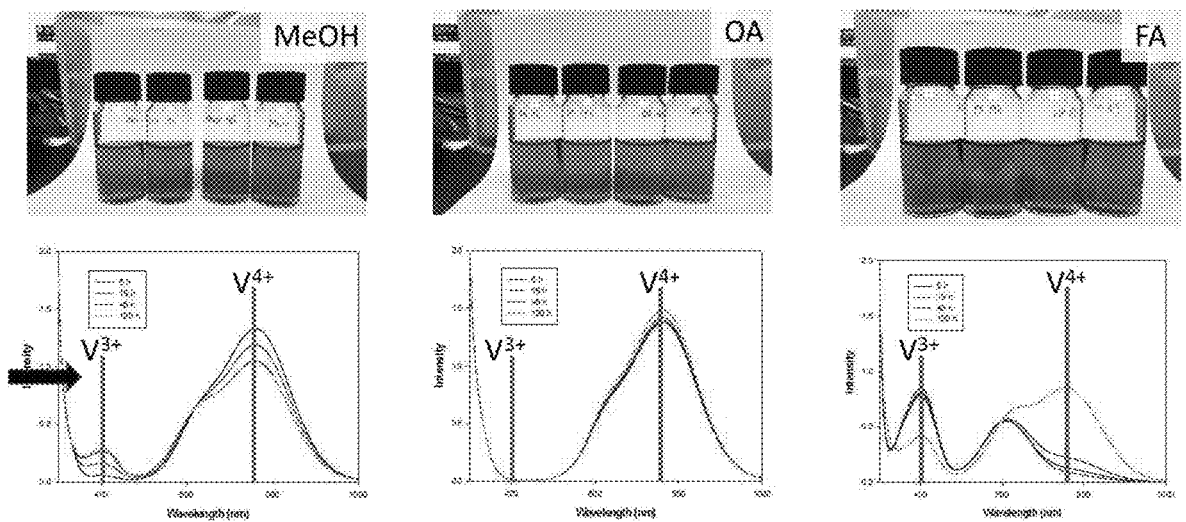
FIG. 5 shows the color change and UV spectrum results depending on the reducing agent of the high-purity electrolyte solution for vanadium redox flow batteries according to an embodiment of the present invention.

FIG. 5 shows color change and UV spectrum results depending on the reducing agent of the high-purity electrolyte solution for vanadium redox flow batteries according to an embodiment of the present invention. The color change was observed after 5 h, 19 h, 46 h, and 120 h elapsed. As a result of preparing an electrolyte solution using methanol (MeOH) as the reducing agent, a slight change from tetravalent vanadium (blue) to trivalent vanadium (green) was observed and a small amount of the trivalent vanadium was detected through the UV measurement result. In the case of using formic acid (FA), both the color change and UV measurement results observed after 5 hours showed conversion to trivalent vanadium. However, after 120 hours elapsed, the trivalent vanadium was converted back to the tetravalent vanadium again, which is considered to be due to a reduction reaction of oxygen by the catalyst. Finally, the result of preparing an electrolyte solution using oxalic acid (OA) as the reducing agent showed that no conversion of tetravalent vanadium to trivalent vanadium was detected at all.

Example 2

In this example, the effects were compared depending on the addition of a catalyst when preparing a high-purity electrolyte solution for vanadium redox flow batteries.

The electrolyte solution to which the catalyst was added was prepared by adding 0.75M of formic acid as a reducing agent to a tetravalent vanadium electrolyte solution (1.5M in 4.5M sulfate), adding 0.1 g of PtRu/C catalyst in 100 ml of a vanadium solution thereto, and then allowing the react to proceed at 55° C. The electrolyte solution, to which no catalyst was added, was prepared in the same manner, except that the PtRu/C catalyst was not added to the electrolyte solution.

Figure 6:
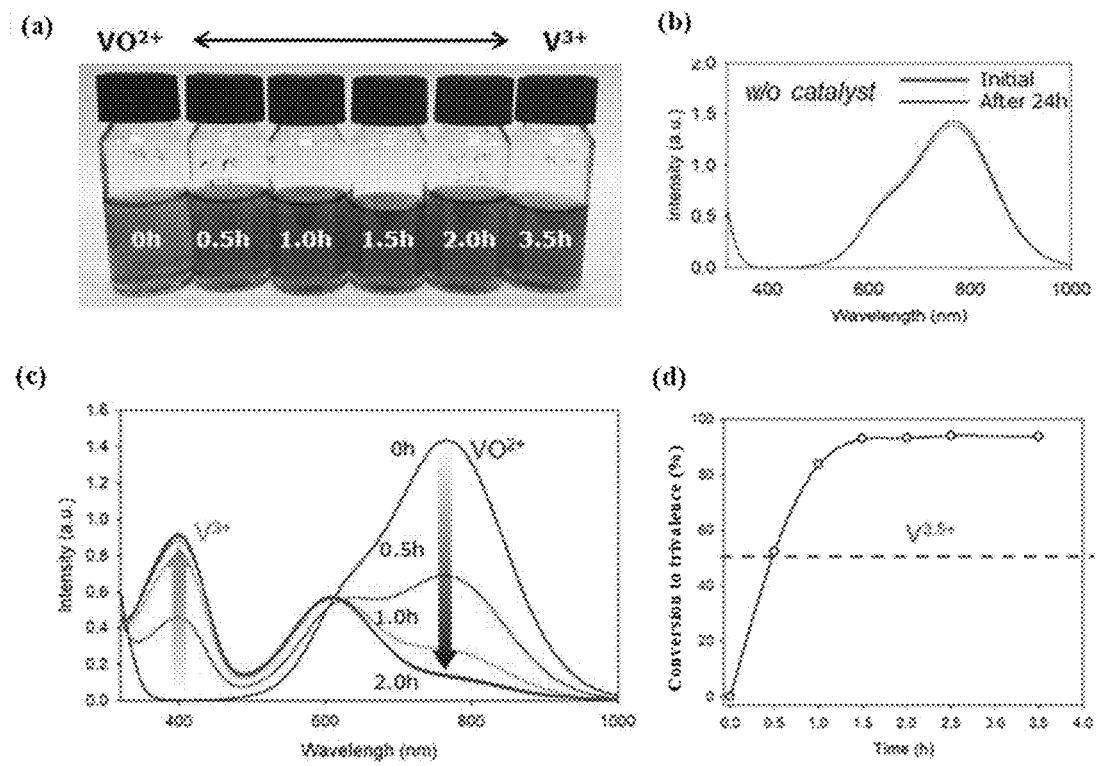
FIG. 6 shows a color change over time, a UV spectrum result and a conversion rate over a reaction time of the high-purity electrolyte solution for vanadium redox flow batteries according to an embodiment of the present invention.

FIG. 6 shows a color change over time, UV spectrum results, and a conversion rate over a reaction time of the high-purity electrolyte solution for vanadium redox flow batteries according to an embodiment of the present invention. FIG. 6A shows the color change of the electrolyte solution to which the catalyst was added over time, confirming conversion of tetravalent vanadium (blue) to trivalent vanadium (green). In addition, in the case of the electrolyte solution to which no catalyst was added, the oxidation number of the tetravalent electrolyte solution did not change even after 24 hours (see FIG. 6B), whereas, in the case of the electrolyte solution to which the catalyst was added, it was confirmed through UV analysis that the concentration of tetravalent electrolyte solution decreased and the concentration of trivalent electrolyte solution increased (see FIG. 6C). FIG. 6D shows the conversion rate of the tetravalent electrolyte solution to the trivalent electrolyte solution over the reaction time of the electrolyte solution, to which the catalyst was added, and it can be seen from FIG. 6D that a 3.5-valent electrolyte solution was prepared through a 30-minute reaction.

Example 3

In this example, the effects were compared depending on the reaction temperature when preparing a high-purity electrolyte solution for vanadium redox flow batteries.

The electrolyte was prepared at 25° C., 50° C., and 80° C. after adding 0.75M of formic acid as a reducing agent to 100 ml of a vanadium solution and adding 0.1 g of a PtRu/C catalyst thereto. The vanadium solution was prepared using a $V^{4+}$ solution (1.5M $V^{4+}$+3M $H_2SO_4$) and a $V_2O_5$ powder (0.75M $V_2O_5$+5.25M $H_2SO_4$).

When the electrolyte solution was prepared using a tetravalent vanadium solution as a vanadium precursor, the reaction was completed at 25° C. for about 5 hours and at 50° C. for about 2 hours. The reaction was completed at 80° C. for 20 minutes, and a boiling phenomenon occurred during the reaction. In addition, when the electrolyte solution was prepared using a pentavalent vanadium powder as a vanadium precursor, the reaction proceeded without the boiling phenomenon at 25° C. for 1.5 hours, and the reaction proceeded along with the boiling phenomenon at 50° C. for about 50 minutes. It was confirmed that the reaction product overheated in 5 minutes at 80° C. and boiled.

Example 4

In this example, the efficiency of a vanadium redox flow battery including an electrolyte solution prepared using a Pt/C catalyst was determined.

An electrolyte was prepared at 55° C. by adding 0.75M of formic acid as a reducing agent to a tetravalent vanadium electrolyte (1.5M in 4.5M sulfate) and adding 0.1 g of a Pt/C catalyst in 100 ml of a vanadium solution thereto. The efficiency of cycle characteristics of the prepared vanadium redox flow battery containing the electrolyte was determined.

Figure 7:
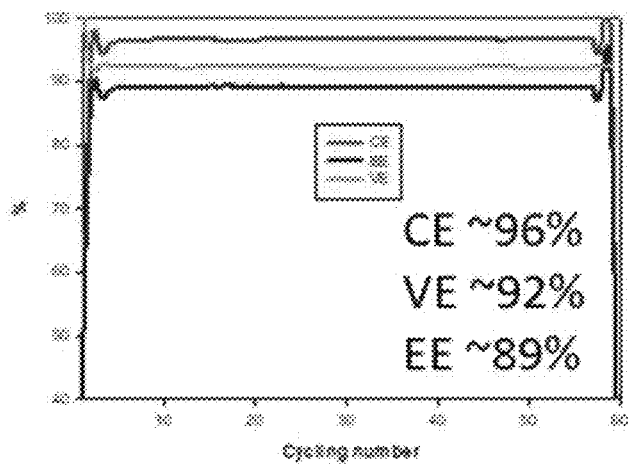
FIG. 7 shows an example of an actual battery using the high-purity electrolyte solution for vanadium redox flow batteries produced using a Pt/C catalyst according to an embodiment of the present invention.
Figure 7:
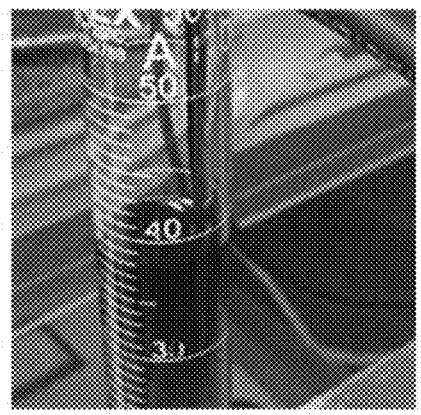

FIG. 7 shows an example of an actual battery using the high-purity electrolyte solution for vanadium redox flow batteries produced using a Pt/C catalyst according to an embodiment of the present invention, wherein CE is 96%, VE is 92%, and EE is 89%, and shows that the battery was stably operated even after 60 charge/discharge cycles. Here, CE represents coulombic efficiency, VE represents voltage efficiency, and EE represents energy efficiency. Each efficiency represents the battery efficiency commonly used in the battery field and is defined as value shown during discharge/value shown during charge. Battery evaluation was conducted by injecting 15 mL of the electrolyte solution prepared by the method of the present invention into a cathode and an anode, and the battery was operated using, as an electrode, a pre-heated commonly used carbon felt (manufactured by SGL), and using, as a separator, a Nafion membrane (N115), pre-treated in a 80° C. 1M sulfuric acid solution for 1 hour, in 80° C. distilled water for 1 hour, and in room-temperature distilled water for 24 hours or more. Charging and discharging of the battery were performed at a current density of 80 mA/cm².

INDUSTRIAL APPLICABILITY

The high-purity electrolyte solution for vanadium redox flow batteries (VRFB) according to the present invention uses a reducing agent that does not leave impurities such as $Zn^{2+}$, which is generated when the electrolyte solution is prepared using a conventional metal reducing agent, and uses a catalyst, thus requiring no additional electrolysis process. In addition, the high-purity electrolyte solution for vanadium redox flow batteries (VRFB) can prevent the generation of toxic substances during the reaction process and is thus environmentally friendly, and is electrochemically excellent under mild process conditions compared to conventional processes. In addition, in the case of using a vanadium redox flow battery containing the electrolyte solution prepared according to the present invention, it is possible to expand the utilization of new and renewable energy due to reduction in the price of large-capacity energy storage devices.

Although the present invention has been described in detail with reference to the specific features, it will be apparent to those skilled in the art that this description is only of a preferred embodiment thereof, and does not limit the scope of the present invention. Thus, the substantial scope of the present invention will be defined by the appended claims and equivalents thereof.

The invention claimed is:

1. A method of preparing a high-purity electrolyte solution for vanadium redox flow batteries, comprising:
    mixing a vanadium precursor, a reducing agent and an acidic solution to prepare a vanadium solution having a valence ranging from pentavalence to tetravalence; and
    adding a reducing agent to the prepared vanadium solution and then reacting the resulting mixture with a catalyst to prepare a solution containing vanadium of a valence ranging from trivalence to tetravalence.

2. The method of preparing a high-purity electrolyte solution for vanadium redox flow batteries of claim 1, wherein the vanadium precursor is at least one selected from the group consisting of $V_2O_5$, $VOSO_4$, $NH_4VO_3$ and $V_2O_4$.

3. The method of preparing a high-purity electrolyte solution for vanadium redox flow batteries of claim 1, wherein the reducing agent is at least one selected from the group consisting of formic acid, formaldehyde, methanol, ethanol, oxalic acid and ammonium hydroxide.

4. The method of preparing a high-purity electrolyte solution for vanadium redox flow batteries of claim 1, wherein the acidic solution is at least one selected from the group consisting of sulfuric acid, hydrochloric acid, nitric acid and phosphoric acid.

5. The method of preparing a high-purity electrolyte solution for vanadium redox flow batteries of claim 1, wherein the catalyst is a noble metal catalyst, a non noble metal catalyst, or an alloy catalyst containing the noble metal catalyst and the non-noble metal catalyst.

6. The method of preparing a high-purity electrolyte solution for vanadium redox flow batteries of claim 5, wherein the noble metal catalyst is at least one selected from the group consisting of platinum (Pt), ruthenium (Ru), palladium (Pd), iridium (Ir), rhodium (Rh), silver (Ag) and gold (Au).

7. The method of preparing a high-purity electrolyte solution for vanadium redox flow batteries of claim 5, wherein the non-noble metal catalyst is at least one selected from the group consisting of iron (Fe), nickel (Ni), copper (Cu), metal oxides, carbon (C) and heteroatom-doped carbon.

8. The method of preparing a high-purity electrolyte solution for vanadium redox flow batteries of claim 1, wherein the catalyst is supported on at least one support selected from the group consisting of carbon, metal oxides and polymers.

9. The method of preparing a high-purity electrolyte solution for vanadium redox flow batteries of claim 1, wherein a concentration of the reducing agent is 0.1M to 3.0M.

10. The method of preparing a high-purity electrolyte solution for vanadium redox flow batteries of claim 1, wherein a concentration of the acidic solution is 0.1M to 10.0M.

11. The method of preparing a high-purity electrolyte solution for vanadium redox flow batteries of claim 1, wherein a concentration of the vanadium precursor is 0.1M to 3.0M.

12. The method of preparing a high-purity electrolyte solution for vanadium redox flow batteries of claim 1, wherein a temperature of the reaction is 0° C. to 120° C.

* * * * *